US008028163B2

(12) United States Patent
Butler et al.

(10) Patent No.: US 8,028,163 B2
(45) Date of Patent: Sep. 27, 2011

(54) METHOD OF DIGITALLY SIGNING DATA AND A DATA REPOSITORY STORING DIGITALLY SIGNED DATA

(75) Inventors: Mark Henry Butler, Bristol (GB); Scott Alan Stanley, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1382 days.

(21) Appl. No.: 11/493,005

(22) Filed: Jul. 26, 2006

(65) Prior Publication Data

US 2007/0101127 A1    May 3, 2007

(30) Foreign Application Priority Data

Oct. 27, 2005  (GB) .................................. 0521898.7

(51) Int. Cl.
*H04L 29/00*   (2006.01)
(52) U.S. Cl. ............... 713/157; 707/1; 707/2; 707/102; 717/154

(58) Field of Classification Search .................. 713/157, 713/168; 707/1, 2, 102; 717/154
See application file for complete search history.

(56) References Cited

U.S. PATENT DOCUMENTS

| | | | |
|---|---|---|---|
| 6,292,795 B1* | 9/2001 | Peters et al. ........................ 707/1 |
| 6,308,320 B1* | 10/2001 | Burch ........................... 717/154 |
| 2001/0027450 A1* | 10/2001 | Shinoda et al. ..................... 707/1 |
| 2001/0037323 A1* | 11/2001 | Moulton et al. ................... 707/1 |
| 2003/0187866 A1* | 10/2003 | Zelenka ........................ 707/102 |
| 2004/0125959 A1* | 7/2004 | Beuque et al. ................. 713/168 |

* cited by examiner

*Primary Examiner* — Vivek Srivastava
*Assistant Examiner* — Thong Truong

(57) ABSTRACT

A hierarchical digital signature method is provided by which different levels of data elements of a data entry are processed in turn to derive function values (for example hash function values) for data elements in the level which are to form part of the digital signature. All function values for one level are combined in a further function to provide an additional function value, and the additional function value is used in the processing of data elements in the next level nearer to the root. This provides a digital signature which can use only selected data elements of a data entry, and which is not sensitive to the ordering of the data entry structure.

16 Claims, 3 Drawing Sheets

METHOD OF DIGITALLY SIGNING DATA AND A DATA REPOSITORY STORING DIGITALLY SIGNED DATA

RELATED APPLICATIONS

The present application is based on, and claims priority from, British Application Number 0521898.7, filed Oct. 27, 2005, the disclosure of which is hereby incorporated by reference herein in its entirety.

FIELD OF THE INVENTION

The invention relates to the use of digital signatures, in particular for data entries of a data repository.

BACKGROUND OF THE INVENTION

There are many applications in which a large amount of content is stored in a repository, with access to the data stored through a network such as the internet.

A data repository may take the form of a conventional database that stores content in records having a number of fields. In conventional databases, some of the fields are indexed so that data in the indexed fields is stored in a separate index. The separate index may be searched for specific search terms to identify records including those search terms.

The use of digital signatures is well known, in order to provide an indication that a data element originates from a genuine source. A digital signature of a message or data is a data object dependent on a secret key known only to the signer and on the content of the message or data being signed.

There are many known digital signature algorithms. A digital signature scheme can be with an appendix, so that the original message/data is input as part of the digital signature verification. Alternatively, digital signature schemes may be with message recovery, in which case the original message/data is recovered during the digital signature verification, for subsequent comparison with the unsigned message. A public key is used to read the signed message and thereby verify the authenticity.

The use of digital signatures for the content of data repositories is known. One common approach for performing digital signing of electronic content in document storage and archival systems involves the use of the entire content of the stored object in the calculation of a digital signature. This approach works well with the storage of data objects where there is no structure to the content of the object and where the only update process involved is through deletion or replacement of a whole object.

Storage of application data in a so-called "semi-structured" format has become common in archival storage devices, and this type of data does not meet the requirements outlined above.

So called "semi-structured" data has a structure which is not regular and does not have a fixed format. The data can quickly evolve. There is also a blurring between the structure and the data stored by the structure. The lack of a fixed schema and the lack of fixed information on the data structures makes the handling of such data difficult using conventional database technology.

Technologies are being developed to allow structure to be extracted from the data objects, with query execution techniques able to exploit this extracted structural information.

This type of data structure allows applications to define complex data objects through the use of semi-structured content. The data objects often consist of content placed in the data object on initial store coupled with annotations added later through a business process lifecycle. For example, a document publication and review process requires the ability to define and store the initial document, followed by the addition of annotations or notes during a review process, so that the content changes in data and in structure.

A semi-structured data store may for example comprise an Extensible Markup Language, XML, store. The stored data has a finer grained structure than the whole object. In this type of environment, updates may be made to an object that involve only specific properties or sub-elements in the archived object.

A digital signature prepared using the entire object does not then allow a third party to update the object. However, there may be instances when it is desirable for a third party to update sub-elements of a document without needing to apply a digital signature.

SUMMARY OF THE INVENTION

According to the invention, there is provided a method of providing a digital signature to a data entry for storing in data repository, the data entry comprising a root and a tree of data elements at different levels from the root, the method comprising:
  identifying data elements of the data entry which are to be digitally signed;
  performing a function on those identified data elements in a level furthest from the root to obtain a first set of results relating to that level;
  performing a function on the first set of results to obtain a level function value derived from the identified data elements in the level;
  changing level to a new level one nearer to the root, and performing a function on a second set of results comprising those identified data elements in the new level as well as the level function value for the level one further from the root, thereby to obtain a level function value derived from the identified data elements in the new level,
  wherein the changing of level is repeated until the level is the first level after the root, and a single function value is obtained which combines function values for all of the identified data elements.

The invention also provides a method of storing data in a data repository, comprising:
  defining the type of data to be stored;
  defining digital signature rules for the defined data type;
  storing data in the data repository; and
  subsequently digitally signing the data using the method of the invention.

The invention also provides a computer program comprising computer program code means adapted to perform all of the steps of the method of the invention when said program is run on a computer.

The invention also provides a data repository system comprising:
  a data repository;
  a client interface for instructions from client applications, wherein the client interface is adapted to:
  receive a definition of the type of data to be stored;
  receive a definition of digital signature rules for the defined data type; and
  receive data for storing in the data repository,
  wherein the system further comprises means for applying a digital signature, and adapted to:
    identify data elements of the data entry which are to be digitally signed based on the digital signature rules; and perform a hierarchical digital signature method by which different levels of data elements of each data entry are processed in turn to derive function values for all identified data elements in the level, and all function values for one level combined in a further function to provide an additional function value, wherein the additional function value is used in the processing of data elements in the next level nearer to the root.

The invention also provides a method of providing a digital signature to a data entry for storing in data repository, the data entry comprising a root and a tree of data elements at different levels from the root, the method comprising:

identifying data elements of the data entry which are to be digitally signed;

performing a function on the identified data elements to obtain function values; and for each level of the data entry, obtaining a single combined function value which is used to represent the identified data elements in the level and in all levels further from the root, wherein for each level which is not the furthest level from the root, the single combined function value combines the function values of the identified data elements of the level and the single combined function value for the level one further from the root, wherein the combined function value for the first level after the root comprises the digital signature.

In addition, the invention provides a data object (and a data repository storing a plurality of the data objects), the data object comprising:

a root;

a tree of data elements at different levels from the root; and a digital signature, wherein the digital signature comprises a function of:

a subset of the data elements of the data entry which are to be digitally signed; and a combined function value for each level of the data object down to and including the level furthest from the root in which there is a data element of the subset, each combined function value, other than the combined function value for said level furthest from the root, being derived from the identified data elements in the respective level and on the combined function value for the level one further from the root, and wherein the combined function value for said level furthest from the root is derived from the identified data elements in the respective level.

BRIEF DESCRIPTION OF THE DRAWINGS

An example of the invention will now be described in detail with reference to the accompanying drawings, in which.

DETAILED DESCRIPTION

The example of the invention described below provides a mechanism by which the digital signing of objects can be performed at a finer grained level to enable updates to the whole object as long as they do not affect the signed portion. This can be used, in particular, for signing semi-structured data in a way that allows fine grained control of the elements in the data object included in the digital signature, so that excluded elements can be altered through addition, update and deletion. This allows critical content of the semi-structured stored data to be included in the signature while still allowing for the addition of annotations that are not critical and do not need to be included in the signature.

In particular, a mechanism is provided, which traverses a tree of elements forming a data object, and a signature is created only for specific elements in that tree. The signature is created using a hash function, for example a commutative hash function.

This implements a hierarchical digital signature method by which different levels of data elements of each data object are processed in turn to derive function values for all identified data elements in the level. All function values for one level can be combined in a further function to provide an additional function value, and this additional function value is used in the processing of data elements in the next level nearer to the root. This iterative process results in a single function value (the digital signature) which is obtained form a level-by-level processing of data entries.

Before describing the invention in detail, an example of a semi-structured data object will be given, and this example of object will be used to describe the invention.

Figure 1:
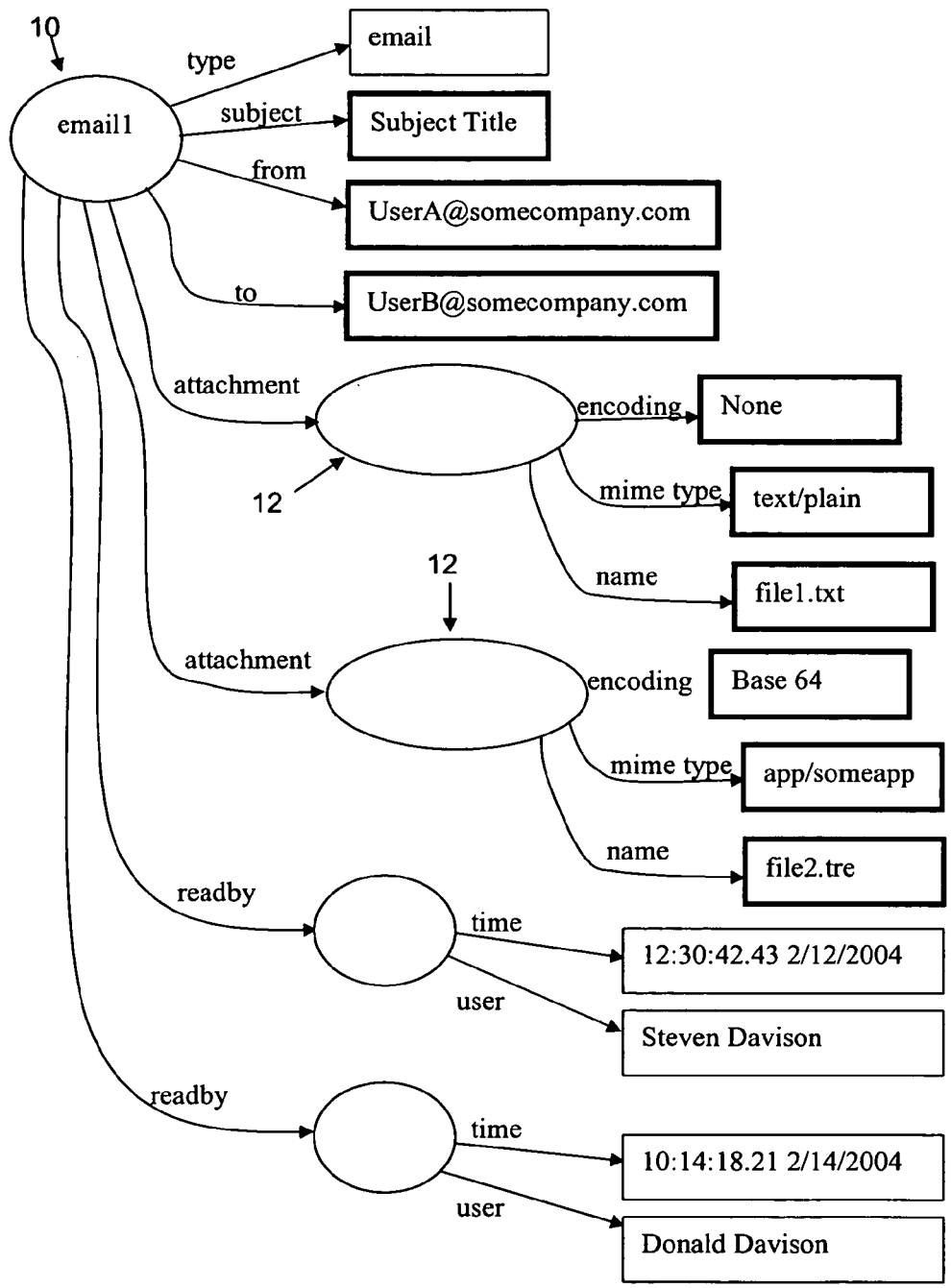
FIG. 1 shows an example of data object used to explain the invention.

FIG. 1 shows graphically the data object, and which comprises one entry in a data repository. The example shows one entry for a data repository storing emails.

The root of this entry is shown as 10, and this is the highest level element of the object. The root has a number of properties, and these are labelled in FIG. 1 against the arrows leading out from the root. As shown, the object has properties "type", "subject", "from", "to", "attachment" and "readby".

The lowest level element is termed a leaf, and in FIG. 1, all of the rectangular boxes show leaf elements, including the definition of the type of entry (email), the subject of the email (subject title), and the sender and destination of the email (userA@somecompany and userB@somecompany).

The property "attachment" leads to a container 12, which contains other elements in the data structure. In the example shown, the container simply contains other leaf objects, but it may contain a further container.

A child can be defined as an element within the structure directly contained by a particular element, and a parent is the structural element one closer to the root than the current element.

The data object shown in FIG. 1 can be expressed using different languages. For example, the semi-structured data object can be expressed in terms of an XML object as:

```
<email>
  <subject>Subject Title </subject>
  <from>UserA@somecompany.com</from>
  <to >UserB@somecompany.com</to>
  <attachment encoding=none>
  <mime-type>text/plain</mime-type>
  <name>file1.txt</name>
  </attachment>
  <attachment encoding=base64>
  <mime-type>app/someapp</mime-type>
  <name>file2.tre</name>
  </attachment>
  <readby time="12:30:42.43 2/12/2004">Steven Davison</readby>
  <readby time="10:14:18.21 2/14/2004">Donald Robison</readby>
</email>
```

There are many ways of expressing the data object above in XML. An alternative serialization is:

```
<Node>
```

```
<UriProperty type="type" uri=?email?/>
<LitProperty type="subject">The subject of an email</LitProperty>
<LitProperty type="from">UserA@somecompany.com</LitProperty>
<LitProperty type="to">UserB@somecompany.com</LitProperty>
<CompProperty type="attachment">
<LitProperty type="encoding">none</LitProperty>
<LitProperty type="mime-type">text/plain</LitProperty>
<LitProperty type="name">file1.txt</LitProperty>
</CompProperty>
<CompProperty type="attachment">
<LitProperty type="encoding">base64</LitProperty>
<LitProperty type="mime-type">app/someapp</LitProperty>
<LitProperty type="name">file2.tre</LitProperty>
</CompProperty>
<CompProperty type="readby">
<LitProperty type="time">12:30:42.43 2/12/2004</LitProperty>
<LitProperty type="user">Steven Davison</LitProperty>
</CompProperty>
<CompProperty type="readby">
<LitProperty type="time">10:14:18.21 2/14/2004</LitProperty>
<LitProperty type="user">Donald Robison</LitProperty>
</CompProperty>
</Node>
```

This code defines a global property "type", as a "uri" property, and defines the leaf elements as a literal string ("lit") property. The containers are defined as "comp" properties, in that they are composite elements containing further leaf elements, which are then defined in the code.

In these examples, the structural elements, "to", "from", "subject", "readby" and "attachment" are children of the root element. Likewise, the parent of "from" is the root element. Similarly, "from", "to", "subject", "mime-type", "name", "encoding", "time", and "user" are all leaf elements while "readby" and "attachment" are container elements.

There are many examples in which it is desirable to digitally sign a data object such as that described above, in order to provide an indication of the authenticity of the data. This digital signature is typically applied when the object is initially stored. However, it may also be desirable to update the document later, for example to change the data concerning the parties that have read the document.

The example of the invention described below thus provides a digital signing scheme in which a selection of the leaf elements, such as "to", "from", "subject", "encoding", "mime-type" and "name", are included in the digital signature. However, other leaf elements, such as the "readby" element and all descendents are not included. In this way, the original data may be stored and signed, and a "readby" annotation may subsequently be added as the object is read by a user.

For this purpose, the data repository provides a mechanism (as an interface language) to allow a client application to define the exact set of properties or elements for each stored semi-structured object that should be included in the digital signature. This mechanism may take the form of a Schema, one possible scheme for the previous data in XML is as follows:

```
<NodeType uri="http://contactNodeType">
  <SignProperty uri="subject"/>
  <SignProperty uri="from"/>
  <SignProperty uri="to"/>
<CompositeProperty uri="attachment">
  <SignProperty uri="name"/>
  <SignProperty uri="encoding"/>
<SignProperty uri="mime-type"/>
  </CompositeProperty>
</NodeType>
```

The parent element, NodeType, has one required attribute uri that defines the URI of the node type that this signing schema corresponds with. As this signing schema is read, it is validated against the node type definition to ensure that it is consistent.

This signing schema defines three properties that will be signed, the properties "subject", "from" and "to" that are direct children of the root and the leaf properties "name", "encoding" and "mime-type" that are children of "attachment". All other properties defined in the node will not be included in the signature. Therefore, the "readby" composite property and the child properties are not be included.

This distinction is shown in FIG. 1, in which the leaf elements forming part of the digital signature are in bolder lines.

This principle can be applied to the digital signature of any semi-structured data objects, regardless of the type of system and encoding language used.

Since the content of a node evolves over several calls to the repository, the time at which the digital signature of a node is calculated is critical. It is possible for a client to define only a portion of the content of a node in one set of operations and then subsequently update to set the remaining content.

The method of storing and signing a node comprises initially defining a node type definition schema, and defining a signing schema for the node type. The node is then stored into the data repository. A number of update steps may be used to set the signed content of the node, before the digital signature method is called to sign the node.

After the signing call on the node has been explicitly called by the client application, the signed content of the node will be considered invariant. All further update calls to add, delete or update properties of types that have been signed will fail.

The signature method must be fully defined, so that given node data will always give rise to the same digital signature.

Figure 2:
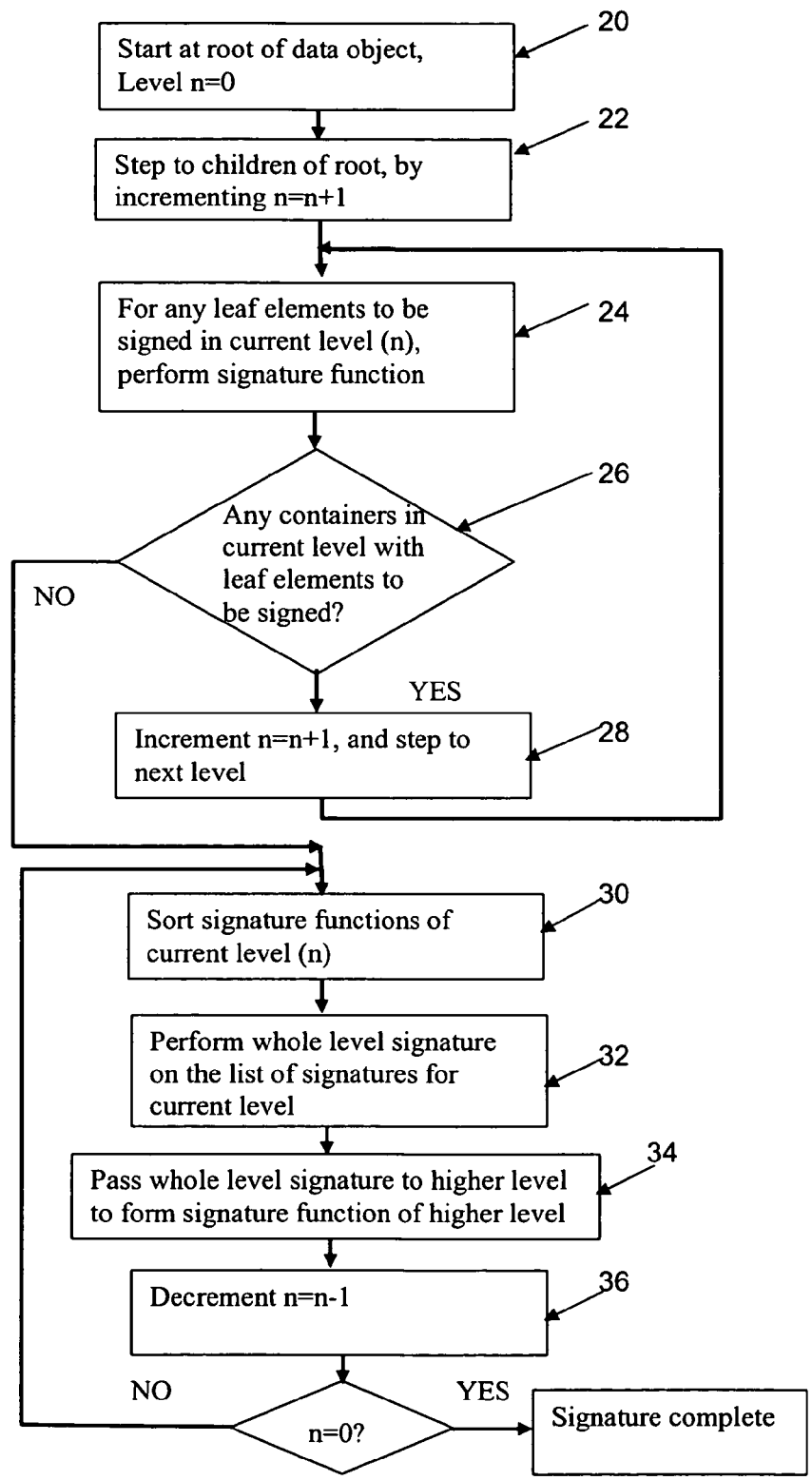
FIG. 2 shows an example of digital signature method of the invention.

The method of signing the semi-structured object, allowing annotations, is shown in FIG. 2.

The signature method starts at the root of the object, as shown in step 20. For the purposes of explanation, this will be defined as level 0 within the object structure.

The process proceeds to the first child level within the structure, and this can be considered as the increment to level n=1, in step 22.

In this level, the leaf elements to be signed are identified in step 24, and the signature function is performed, on the property name and content value. This signature function may comprise a Hash Function, for example SHA-1, SHA-2, MD5 or many other known Hash functions conventionally used in digital signature algorithms.

In the data object example of FIG. 1, this provides a Hash function for the properties (and related content) "subject", "from" and "to".

If there are any container elements in the current level which have further leaf elements to be signed, this is determined in step 26. If there are none, the method has reached the lowest level of the object that is needed, and can proceed to step 30. If there are such containers, as in the example of FIG. 1 (the attachment containers), the value of n is incremented in step 28, and the method returns to step 24 to perform the function on any leaf elements in the new lower level which need signing.

This process continues until the lowest level (highest value of n) is reached in which there are leaf elements to be signed. When there are no further containers having content to be signed, the method proceeds to step 30.

The method is then at the lowest level, in the example of FIG. 1, n=2, and the Hash function has been performed for all leaf elements in that level, which in the example of FIG. 1 is the leaf elements for the properties "encoding", "mime type" and "name" for the two attachment elements.

These Hash functions are sorted, based on the Hash function values, for example simply by ordering the values, which may be Hexadecimal values.

This ordering is not affected by the detailed structure of the data object. The Hash function is then carried out on the sorted list, in step 32, and in step 34, this new single function is passed to the preceding higher level, to form a part of the digital signature for the next higher level.

Thus, in step 36 the value of n is decreased by 1, so that the method essentially climbs back towards the root. In this example, the method proceeds back to level n=1.

The functions for the higher level are then sorted, and these include the Hash functions for the leaf elements in that level ("subject", "from" and "to"), but also the Hash function derived from the lower level (this is the Hash function of the sorted Hash functions for each of the six data elements of level 2 shown in FIG. 1).

The method reaches the root when n=0, and there is then a single Hash function which incorporates digital signed values of all of the leaf elements to be signed.

The method thus iterates through the child elements that are to be signed, and for each signed child, calculate an appropriate hash based on the content value for the property and the property name.

The Hash function used should be collision resistant, such that given a pair of hash values (a,b), it is hard to find a pair (c,d) not equal to (a,b) such that h(a,b)=h(c,d).

This approach provides a mechanism for allowing client applications to define how nodes should be signed enabling non-signed properties to be updated as desired by the client application without impacting the signature of the node.

This enables the critical content of the node to initially be stored and signed. Then, at later times annotations can be made through the non-signed content of the node.

The algorithm described above enables consistent calculation of the digital signatures based on the appropriate properties at each level, and is robust against alterations to the ordering of the properties. This is critically important since there is no guarantee that ordering of properties will not change as a stored node is read and re-written.

Explicit in this algorithm is that all elements that are not explicitly defined as being included in the digital signature are excluded. For example in the example of FIG. 1, the "readby" annotations do not affect the signature. Therefore they may be added, modified or deleted without invalidating the original digital signature.

A semi-structured object store using this type of signing algorithm can impose read-only restrictions on specific elements in the hierarchy of an object that has been digitally signed. For instance, for the example above, the properties "to", "from", "subject", "mime-type", etc. should not be allowed to be altered by client applications.

This method of signing semi-structured data allows client applications to define explicitly what portions of the content will be included in the digital signature. This allows flexible definitions of a data model that allow updates to previously signed objects without invalidating the signature. This is particularly important in a data store where objects are to be written many times, rather than more conventional static databases in which objects are not written once and read many times.

One of the primary difficulties with signing objects that may be altered, even if the alterations do not change the content of the signed portions of the object, is that the re-write process may change the ordering of the signed elements. A change in order can invalidate the signature on the object if a signature method is not defined in a robust manner. The hierarchical method described above prevents re-ordering or re-writing of the semi-structured data object from invalidating the digital signature as long as the actual content of each signed leaf element is not changed.

The method above provides a way of signing nodes that consist of trees of properties, in such a way that only some properties of the nodes are signed. This signing is done in a way that the ordering of properties can be changed and that additional unsigned properties can be added, updated or deleted from the node without requiring the signature to be updated.

Figure 3:
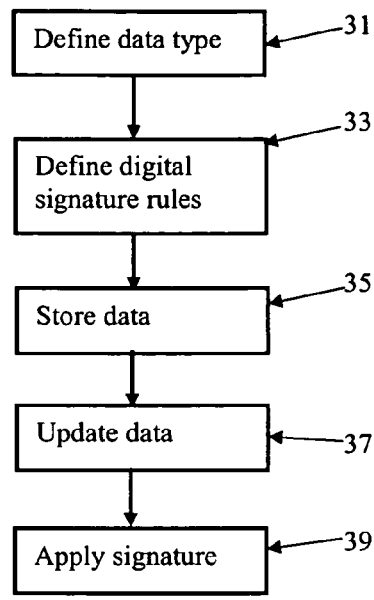
FIG. 3 shows an example of method of the invention for storing data.

The method of storing and signing a node is shown in FIG. 3. The node type definition schema is provided in step 31, and the signing schema for the node type is defined in step 33. The node is then stored into the data repository in step 35. A number of update steps 37 may be used to set the signed content of the node, before the digital signature method is called to sign the node in step 39.

In the example above, the digital signature is implemented at the data model level, rather than at the serialization (i.e. code) level. In particular, the digital signature function is executed on the data object property names and leaf element data. This makes the digital signature function independent of the specific implementation of the data repository. This also simplifies the canonicalization algorithm used to analyze the different levels of the data object to implement the digital signature.

The method described above can be implemented at the server which hosts the data repository.

Figure 4:
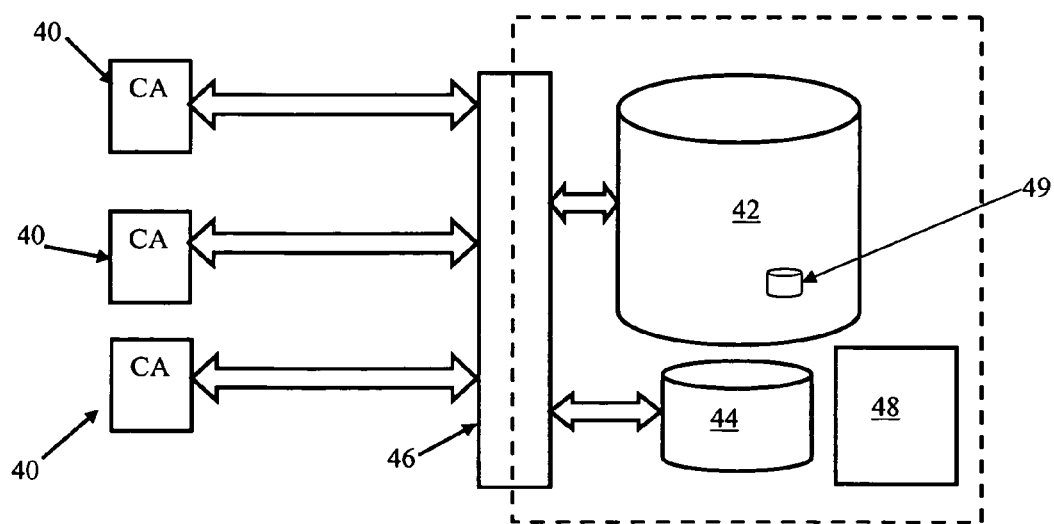
FIG. 4 shows a data repository system of the invention.

FIG. 4 shows in schematic form the overall system of the invention.

The system shown in FIG. 4 is a data repository system, in which client applications 40 access the data stored in a data repository 42. The client applications provide data for storage and also handle repository search queries, and multiple client applications 40 may have (substantially) simultaneous access to the data repository 42. The system includes a cache memory 44 used in the provision of results to the client applications 40, and a client interface 46 converts the communications from the client applications into control commands for the data repository 42 and cache 44. The data repository, cache and interface together may be considered to define a server.

The data repository includes data objects, of the type shown in FIG. 14, and one such data object is shown schematically as 49. The data object includes the a root and a tree of data elements at different levels from the root as shown in FIG. 1, but also includes the digital signature. As will be clear from the above, the digital signature is a function of the subset of the data elements of the data entry which are to be digitally signed; and the combined function values for each level of the data object. Each combined function value is derived from the identified data elements in the respective level and on the combined function value for the level one further from the root.

The server further comprises a processor 48 which is configured to run software providing an algorithm that performs the digital signature method explained with reference to FIG. 2.

The messages between the client interface 16 and the client applications may use HTTP messages, and these may be provided over a web network, or other network.

The digital signature may of course be applied remotely, and the digitally signed data provided to the server which hosts the data repository.

Although one example of data repository has been given for storing email data, the invention can be applied to any data repository. The invention is of particular benefit for semi-structured data repositories, in which the data elements evolve, but the invention may be applied to the data stored in more conventional databases.

There are numerous digital signature algorithms which can be used, and these will be well known to those skilled in the art. The same function may be used for all hierarchical function calculations, but different functions could be in principle called for the digital signature function for different levels of the data structure of each object.

In the example above, a single function value is used to represent the combination of the function values for all leaf elements in the level below. However, multiple additional function values may be used for this purpose. For example, with reference to FIG. 1, each attachment container may be represented in level 1 by its own function value derived from the corresponding leaf elements. Thus, the overall digital signature will be based on the Hash function applied to the three level 1 leaf elements ("subject", "from" and "to") and two additional Hash function values.

The digital signature algorithms have not been described in detail, as these are conventional in the art. Many different forms of Hash function may be used, including checksums.

The use of digital signatures for XML data is also well known, and indeed the W3C has provided a recommendation (of 12 Feb. 2002) which specifies XML digital signature processing rules and syntax, at http://www.w3.org/TR/xmld-sig-core.

The data repository can take many different forms, and an XML based repository for semi-structured data is only one example. The data repository will typically store only meta-data about a data object, rather than the object itself, and the data objects are external to the data repository. This enables the data repository to store metadata for a large number of items of content, which content could not all be stored in a single database. Thus, in the example above, the data object does not include the email text or attachment text.

FIG. 4 thus shows only one simplified data repository system. The data repository may be implemented as a router which communicates with multiple data stores, in the form of so-called "smart cells". The repository may also act as an index rather than a data store, with the content being obtained from other locations as determined by the indexes stored in the central data repository.

Various other modifications will be apparent to those skilled in the art.

We claim:

1. A method of providing a digital signature to a data entry for storing in a data repository, the data entry comprising a root and a tree of data elements at different levels from the root, the method comprising:
   identifying, by a processor, data elements of the data entry which are to be digitally signed;
   performing, by the processor, a function on those identified data elements in a level furthest from the root to obtain a first set of results relating to that level;
   performing, by the processor, the function on the first set of results to obtain a level function value derived from the identified data elements in the level;
   changing, by the processor, level to a new level one nearer to the root, and performing the function on a second set of results comprising those identified data elements in the new level as well as the level function value for the level one further from the root, thereby to obtain a level function value derived from the identified data elements in the new level,
   wherein the changing of level is repeated until the level is the first level after the root, and a single function value is obtained which combines function values for all of the identified data elements.

2. A method as claimed in claim 1, wherein the function performed on the data elements in the level furthest from the root, on the first set of results and on the second set or sets of results is a digital signature hash function.

3. A method as claimed in claim 2, further comprising sorting the first set of results according to hash values in the first set of results, and applying the digital signature hash function on the sorted first set of results to obtain the level function value.

4. A method as claimed in claim 3, further comprising:
   sorting, according to hash values, the second set of results and the level function value for the level one further from the root, and applying the digital signature hash function on the sorted second set of results and the level function value for the level one further from the root.

5. A method as claimed in claim 2, further comprising:
   defining a type of data to be stored;
   defining digital signature rules for the defined data type, wherein identifying the data elements uses the digital signature rules to identify a subset less than all of the data elements in the data entry, wherein the digital signature hash function is not applied to one or more data elements in a part of the data entry not in the subset; and
   forming a digital signature for the data entry using the single function value.

6. A method as claimed in claim 5, wherein the digital signature rules define the properties of the data elements to form the basis of the digital signature.

7. A method as claimed in claim 2, wherein identifying the data elements which are to be digitally signed comprises:
   identifying a subset less than all of the data elements in the data entry, wherein the digital signature hash function is not applied to one or more data elements in a part of the data entry not in the subset.

8. A method as claimed in claim 7, wherein the single function value forms a digital signature of the data entry, the method further comprising:
   modifying the part of the data entry not in the subset without changing the digital signature of the data entry.

9. A method as claimed in claim 7, further comprising:
   forming a digital signature of the data entry using the single function value.

10. A method as claimed in claim 7, wherein the first set of results includes function values produced by applying the digital signature hash function on the identified data elements in the level furthest from the root, and
   wherein the second set of results includes the level function value for the level one further away from the root, and function values for the identified data elements in the new level, wherein the function values for the identified data elements in the new level are produced by applying the digital signature function on the identified data elements in the new level.

11. A method as claimed in claim 1, wherein the function performed on each of the identified data elements comprises the function applied to a property name and property content for each data element.

12. A method as claimed in claim 1, further comprising defining the identified data elements as read only data entries.

13. A data repository system comprising:
a data repository;
a client interface for instructions from client applications, wherein the client interface is configured to:
receive a definition of a type of data to be stored;
receive a definition of digital signature rules for the defined data type; and
receive data for storing in the data repository,
wherein the system further comprises a processor configured to:
identify data elements of a data entry in the data repository which are to be digitally signed based on the digital signature rules, wherein the data entry has a root and a tree of data elements at different levels from the root; and
perform a hierarchical digital signature algorithm by which different levels of the identified data elements of the data entry are processed in turn, wherein the hierarchical digital signal algorithm comprises:
applying a digital signature function on those identified data elements in a level furthest from the root to obtain a first set of results relating to that level, the first set of results including function values produced by applying the digital signature function on the corresponding identified data elements;
applying the digital signature function on the first set of results to obtain an additional function value derived from the identified data elements in the level;
changing level to a new level one nearer to the root, and applying the digital signature function on a second set of results comprising function values for those identified data elements in the new level as well as the additional function value for the level one further from the root, thereby to obtain an additional function value derived from the identified data elements in the new level,
wherein the changing of level is repeated until a single function value is obtained which combines the function values for all of the identified data elements.

14. A data repository system as claimed in claim 13, wherein identifying the data elements which are to be digitally signed comprises:
identifying a subset less than all of the data elements in the data entry, wherein the digital signature function is not applied to one or more data elements in a part of the data entry not in the subset.

15. A data repository system as claimed in claim 14, wherein the processor is configured to further:
modify the part of the data entry not in the subset without changing a digital signature of the data entry.

16. A method of providing a digital signature to a data entry for storing in a data repository, the data entry comprising a root and a tree of data elements at different levels from the root, the method comprising:
identifying, by a processor, data elements of the data entry which are to be digitally signed;
performing, by the processor, a function on the identified data elements to obtain function values; and
for each level of the data entry, obtaining a corresponding single combined function value which is used to represent the identified data elements in the level and in all levels further from the root, wherein for each level which is not the furthest level from the root, the corresponding single combined function value is obtained by applying the function on the function values of the identified data elements of the respective level and the single combined function value for the level one further from the root,
wherein the single combined function value for the first level after the root comprises the digital signature.

* * * * *